Nov. 26, 1935.  W. B. MOORE ET AL  2,022,320

PERCOLATOR TOP

Filed April 6, 1935

INVENTORS.
Walter B. Moore.
Justin K. Wahl.
BY
ATTORNEYS.

Patented Nov. 26, 1935

2,022,320

UNITED STATES PATENT OFFICE 2,022,320

PERCOLATOR TOP

Walter B. Moore and Justin K. Wahl, West Lafayette, Ohio, assignors to The Moore Enameling and Manufacturing Company, West Lafayette, Ohio, a corporation of Ohio Application April 6, 1935, Serial No. 15,066

3 Claims. (Cl. 53—3)

Our invention relates to percolator tops. It has to do, more particularly, with novel means for holding the glass top in position on the metal lid of a coffee percolator or other similar article.

At the present time, glass percolator tops are usually held in position on the metal lid of the percolator by means of a pair of lugs formed on the glass top which fit beneath the edge of the metal cover or lid. The metal lid is provided with an opening of sufficiently large diameter to receive the lower end of the glass top and a pair of notches are provided in the metal lid at the edge of the opening to permit the glass lugs to slip therethrough. When the lower end of the glass top is thus positioned in the opening in the lid, it may then be rotated so that the glass lugs will ultimately be disposed beneath the metal lid. It is necessary to provide a bead or lip at the edge of the opening in the metal lid which has an inclined surface, so that when the glass top is rotated, the glass lugs slide along this surface so that the glass top will be wedged in position. When expansion occurs from heat of the coffee, these small glass lugs fitting tightly against the metal lid or cover are broken off permitting the glass top to fall off the percolator into a cup of coffee when pouring the coffee. Also, because of variations in thickness of the metal lid or in the number of coats of enamel applied thereto, oftentimes the glass top will fit loosely thereon and vibrate thereon so that sometimes the glass lugs will move to such positions that they will slip through the notches of the lip and the glass top will fall off. Also, it is an expensive operation to form the bead or lip at the edge of the opening in the metal lid and to form the notches in the lid.

Another means for holding glass percolator tops in position has embodied a pair of lugs which slip through notches in the metal lid and which may be disposed beneath the lid in combination with an expansible and contractible ring which fits between the lower surface of the lid and the lugs, thus aiding in keeping the glass top in position. However, this structure has the same main disadvantage that the structure previously described possesses. That is, expansion due to heat will cause the small glass projections or lugs on the top to break off and to permit falling off of the glass top.

One of the objects of our invention is to provide means for holding a glass percolator top in position on the metal lid of such a nature that there will be no danger of the glass top falling off due to breakage caused by expansion and contraction.

Another object of our invention is to provide means for holding a glass percolator top in position on the metal lid, the means being of such a nature that, regardless of the thickness of the metal of the lid or the number of coats of enamel thereon, the glass top will be held tightly on the lid.

Another object of our invention is to provide means for holding the glass percolator top in position as indicated but which is of such a nature that the top may be readily applied to or removed from the lid.

Another object of our invention is to provide means for holding a percolator top in position which is very simple in nature and inexpensive to produce.

In its preferred form, our invention contemplates the provision of a glass percolator top having an outwardly flared skirt on its lower end and an outwardly projecting flange spaced upwardly a short distance from its lower end. The skirt is adapted to pass downwardly through an opening in the metal lid or cover to which it is to be applied and the outwardly projecting flange will rest on the upper surface of the metal lid or cover. A contractible metal ring is then positioned on the outer surface of the flared skirt on the lower end of the glass top. This metal ring will tend to contract and decrease in diameter and consequently will slide upwardly on the inclined surface of the flared skirt. Thus, the edge of the metal lid will be firmly gripped between the outwardly projecting flange on the glass top and the contractible ring and, consequently, the glass top will always be held tightly in position on the lid or cover. This will be true regardless of the thickness of the metal of the lid or the number of coats of enamel thereon.

The preferred embodiment of our invention is illustrated in the accompanying drawing wherein similar characters of reference designate corresponding parts and wherein.

Figure 1:
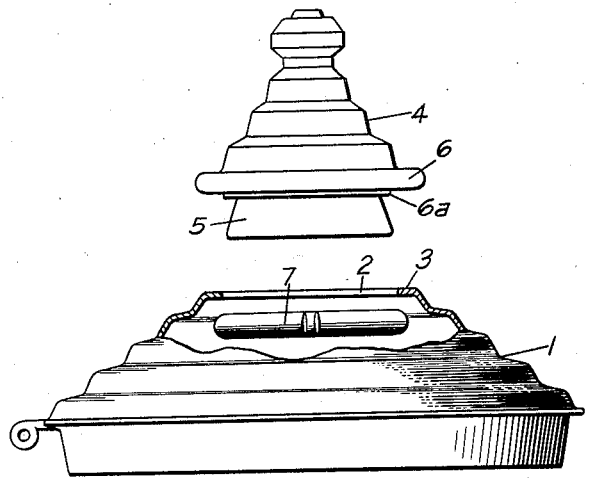
Figure 1 is a side elevation, partly broken away, showing a metal lid or cover, the glass top and the contractible ring before they are assembled.

With reference to the drawing, we illustrate a metal lid or cover 1 of a type commonly employed on percolators. This lid or cover is provided with a large centrally disposed circular opening 2 in its upper end. The lid or cover is so formed that an inwardly projecting flange 3 is provided adjacent the edge of the opening 2.

We provide a glass percolator top 4 which may be of any preferred shape. However, this glass percolator top has an outwardly flared skirt 5 at its lower end. At a point spaced upwardly from the extreme lower end of this glass top, an outwardly projecting peripheral flange 6 is formed. The largest part of the skirt 5, the extreme lower end thereof, is slightly less in diameter than the circular opening 2 in the lid 1. Consequently, the flared skirt may be passed downwardly through the opening 2. However, the peripheral flange 6 is of such a diameter that it will limit downward movement of the top 4. When the lower end of the top 4 is inserted in the opening 2, the flange 6 will rest on the upper surface of the flange 3 of the metal lid or cover 1. Below the flange 6, a shoulder 6a is preferably formed. This shoulder is slightly less in diameter than the opening 2 in the lid 1 and slightly greater in diameter than the lower end of skirt 5. It aids in centering the glass top relative to the opening 2.

Figure 2:
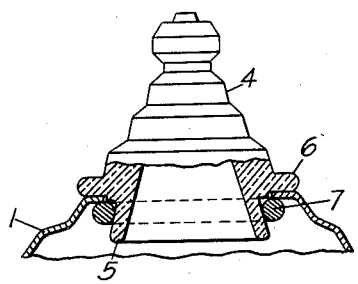
Figure 2 is a view partly in section and partly in side elevation showing the glass top applied to the metal lid.
Figure 3:
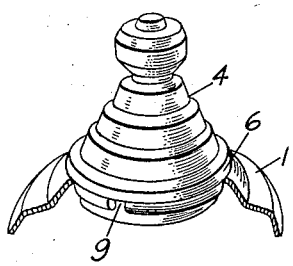
Figure 3 is a perspective view, partly broken away, of the assembled structure.

A contractible metal ring 7 is provided which is adapted to be placed in surrounding relation to the flared skirt 5 when it has been inserted through the opening 2. The height or width of the flared skirt 5 is much greater than the diameter of the ring 7 as shown best in Figures 2, 3, and 4. The ring 7 is of such a diameter that it will be necessary to expand it slightly before it can be placed around the flared skirt 5. However, when positioned on the skirt, it will tend to contract which will cause it to slide upwardly on the inclined surface 8 of the flared skirt. Consequently, the flange 3 of the metal lid 1 will be firmly gripped between the peripheral flange 6 on the glass top and the metal ring 7. The shoulder 6a is of such a size as not to interfere with this gripping action. Regardless of the thickness of the metal flange 3, it will be tightly gripped between flange 6 and ring 7 because the ring 7 will always tend to slide upwardly on the flared skirt 5. The ends of the ring 7 will always be slightly spaced apart as at 9 so that the ring will always tend to contract.

With this structure, there will be no danger of breakage due to expansion and contraction. If the heat causes the glass top 4 to expand, the metal ring 7 will slide on the inclined surface 8 of the flared skirt and permit this expansion without breakage of the glass top. When the top cools and contracts, the ring 7 will slide on the flared skirt to compensate for this. Thus, the glass top will be tightly held in position on the metal lid at all times.

Figure 4:
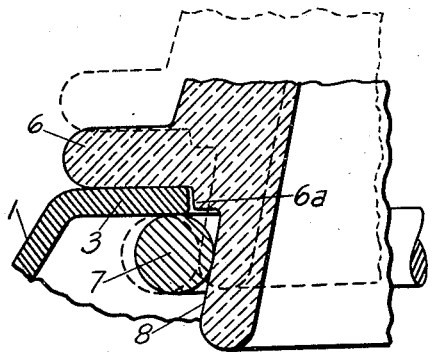
Figure 4 is an enlarged detail showing the means for holding the glass top in position and illustrating by dotted lines how the glass top may be removed from the metal lid.
Figure 5:
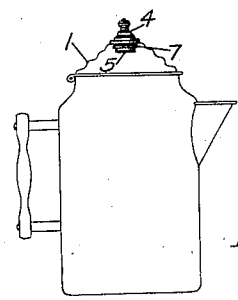
Figure 5 is a more or less diagrammatic view illustrating the device in position on a percolator.

In case it is desired to remove the glass top from the lid 1, it is merely necessary to push upwardly on the glass top, until the metal ring 7 will slide off the extreme lower end thereof, as indicated by the dotted lines in Figure 4.

With this structure, it is possible to eliminate the operations of forming a bead or lip at the edge of the opening in the metal cover or lid and forming the notches therein. This eliminates considerable expense. All portions of the glass top may be made of sturdy construction and since the ring and the flared skirt cooperate as indicated, there will be no danger of breakage. The glass percolator top will always be tightly held in position on the metal lid and will not vibrate or rattle.

Having thus described our invention, what we claim is:

1. In combination, a glass percolator top having an outwardly flared continuous annular skirt on its extreme lower end, a peripheral flange projecting outwardly from said glass top and formed integrally therewith at a point spaced above the lower edge of the glass top, a metal lid having a circular opening formed therein which receives the lower end of the glass percolator top and which is of such a diameter as to permit passing of the flared skirt on the glass top therethrough, the lower portion of said flared skirt being slightly less in diameter than the diameter of said opening but the upper portion of said skirt being of substantially less diameter than said opening, said peripheral flange resting on the upper surface of the metal lid when the lower end of the glass top is positioned in said opening and said flared skirt projecting through the lid a considerable distance, there being an annular space between the upper portion of said skirt and the edge of said opening, an annular shoulder formed on said glass top directly below said flange for centering said skirt in said opening, and a split resilient ring disposed in surrounding relation to the flared skirt and normally contacting with the lower surface of the metal lid and being of such a shape and size that it will not pass up through said annular space, the flared skirt being greater in height than the cross-sectional dimension of said split resilient ring, said split resilient ring normally tending to slide upwardly on the flared skirt so that the metal lid will be firmly gripped between said peripheral flange and said split resilient ring but being slidable downwardly off the lower end of the skirt when the glass top is forced upwardly in order to permit removal thereof.

2. In combination, a glass percolator top having an outwardly flared continuous annular skirt on its extreme lower end, a peripheral flange projecting outwardly from said glass top and formed integrally therewith at a point spaced above the lower edge of the glass top, a metal lid having a circular opening formed therein which receives the lower end of the glass percolator top and which is of such a diameter as to permit passing of the flared skirt on the glass top therethrough, the lower portion of said flared skirt being slightly less in diameter than the diameter of said opening but the upper portion of said skirt being of substantially less diameter than said opening, said peripheral flange resting on the upper surface of the metal lid when the lower end of the glass top is positioned in said opening and said flared skirt projecting through the lid a considerable distance, there being an annular space between the upper portion of said skirt and the edge of said opening, and a contractible metal retaining member disposed in surrounding relation to the flared skirt and normally contacting with the lower surface of the metal lid and being of such a shape and size that it will not pass up through said annular space, said metal retaining member normally tending to slide upwardly on the flared skirt so that the metal lid will be firmly gripped between said peripheral flange and said metal retaining member but being slidable downwardly off the lower end of the skirt when the glass top is forced upwardly in order to permit removal thereof.

3. In combination, a percolator top having an outwardly flared continuous skirt on its extreme lower end, an outwardly projecting portion on said percolator top at a point spaced above the lower edge thereof, a lid having an opening formed therein which receives the lower end of the percolator top and which is of such a size as to permit passing of the flared skirt on the top therethrough, said projection resting on the upper surface of the lid when the lower end of the top is positioned in said opening and said flared skirt projecting through the lid a considerable distance, and a contractible retaining member disposed in surrounding relation to the flared skirt and normally contacting with the lower surface of the lid, said retaining member normally tending to slide upwardly on the flared skirt so that the lid will be firmly gripped between said projection and said retaining member but being slidable downwardly off the lower end of the skirt when the top is forced upwardly in order to permit removal thereof.

WALTER B. MOORE.
JUSTIN K. WAHL.